United States Patent [19]
Bhusri

[11] Patent Number: 4,959,849
[45] Date of Patent: Sep. 25, 1990

[54] END-TO-END NETWORK SURVEILLANCE

[75] Inventor: Gurcharan S. Bhusri, Holmdel, N.J.

[73] Assignee: AT&T Bell Laboratories, Murray Hill, N.J.

[21] Appl. No.: 387,727

[22] Filed: Jul. 31, 1989

[51] Int. Cl.$^5$ .......................... H04L 1/00; H04M 3/32
[52] U.S. Cl. ..................................... 379/32; 371/20.1; 371/29.1
[58] Field of Search ..................... 379/14, 26, 32, 230; 370/16; 371/20.1, 20.4, 29.1

[56] References Cited
U.S. PATENT DOCUMENTS 4,125,745 11/1978 Steidl .
4,713,810 12/1987 Chum ................................. 371/20.1
4,788,718 11/1988 McNabb et al. .

OTHER PUBLICATIONS

C. W. Brown, IEEE Computer Society's First International Computer & App. Conf., 1977, "No. 2 Switching Control . . . ", pp. 46–50.
J. Klimowski, Proc. National Electronic Conf., vol. 32, 1978, "GTE's Remote Maintenance Monitor . . . ", pp. 308–313.
Suzuki et al., Review of the Elec. Comm. Laboratories, vol. 28, Nos. 1–2, 1980, "Common Channel Signaling Network Structure", pp. 50–66.
G. C. Schlanger, IEEE J. on Selected Areas in Commn., vol. SAC-4, No. 3, May 1986, "An Overview of Signaling System No. 7", pp. 360–371.

Primary Examiner—Stafford D. Schreyer
Attorney, Agent, or Firm—Gregory C. Ranieri

[57] ABSTRACT

A method and architecture for end-to-end surveillance of network systems is disclosed. Comprehensive and rapid fault detection, fault segmentation, and self-testing of network elements are accomplished by utilizing a bit position in message signal units to indicate the surveillance of a particular call. When the surveillance bit is set, message signal units related to the selected call are copied and forwarded to a processing element. The processing element correlates message signal units received to afford fault analysis and fault segmentation of network failures on an end-to-end basis. Additionally, the method and architecture may permit quality control for the network system by utilizing information within the message signal units received by the processing element.

21 Claims, 3 Drawing Sheets

END-TO-END NETWORK SURVEILLANCE

TECHNICAL FIELD

This invention relates to a method and system architecture for communication network systems and, more particularly, to a method and system architecture for fault detection and segmentation in such communication systems.

BACKGROUND OF THE INVENTION

Failure to establish calls upon request from subscribers results in significant loss of revenue to the respective communication carrier. Such failures usually result from errors in stored control programs, databases, or network elements themselves such as switches, network control points, signal transfer points, and the like. Clearly, downtime and associated deterioration in customer service quality and lost revenues could be minimized by surveillance techniques that detect at the earliest opportunity the onset and cause of failure.

Current surveillance techniques, effected by maintenance operation systems, detect and segment faults by simply noting the occurrence of a fault and identifying the suspected faulting network element. In addition to effecting such fault detection and segmentation on actual call failures, test calls may be initiated to effect additional fault analysis. For example, test calls may be sent to specific network elements via specific routes for routing verification. For a detailed discussion of Computer Society's First International Computer and Application Conference, pp. 46-50 (1977) and J. Klimowski, *Proceedings of the National Electronic Conference*, Vol. 32, pp. 308-313 (1978).

In common practice, prior art surveillance techniques simply result in a network element storing data on failures, threshold crossing events or the like. The reported data, commonly referred to as surveillance data, relates only to failures associated with that network element. The network element must then be either polled to retrieve the surveillance data or programmed, at a predetermined threshold level, to report such failures. The surveillance data is limited in nature to failures occurring within the locality of the reporting network element. Accordingly, detailed analysis of the nature and reason for the fault—the underlying cause of failure—cannot be determined for an extended period of time. Specifically, failures resulting from interactions between network elements and stored control programs cannot be analyzed without related information from each network element associated with the failure. In addition, transient problems that occur in the network system disappear long before a complete investigation can be made. Without a history of the call's progress prior to its failure, a cause of failure which is transient may never be determined. While routing verification techniques test the integrity of a specific route, these techniques likewise result in limited information and add additionally to traffic congestion.

Both the prior art and the invention may in certain embodiments relate to techniques for transmitting signaling information on a "network" which is independent of the communication network, such as common channel signaling. Consequently, a better appreciation of the invention will be gained from the following discussion of common channel signaling.

Common channel signaling has resulted in large part from the increased demand for advanced services such as ISDN and other digital services. Common channel signaling is an out-of-band technique for exchanging trunk signaling and other information between stored program controlled nodes over channels separate from those used to carry voice or data signals. Exemplary of such common channel signaling techniques is one which uses the CCITT No. 7 protocol. For a discussion of common channel signaling No. 7 network signaling see G. G. Schanger, *IEEE Journal on Selected Areas in Communication*, Vol. SAC-4, No. 3, pp. 360-65 (1986), and S. Suzuki et al., *Review of the Electrical Communication Laboratories*, Vol. 28, No. 1-2, pp. 50-65 (1980).

SUMMARY OF THE INVENTION

A method and a system architecture for end-to-end surveillance afford comprehensive and rapid fault detection, and fault segmentation which address the foregoing problem in the prior art. Selected calls entering a network system are placed under end-to-end surveillance by setting a predetermined bit, called the surveillance bit, in message signal units associated with each of the selected calls. Message signal units with their surveillance bit set are copied and forwarded to a processing element by each network element, traversed by the calls. The forwarded message signal units and their correlation permit the progress of each selected call to be monitored from network element to network element. As a result, a history for each selected call is provided up to the call's failure.

The processing element correlates and analyzes message signal units received. Having a complete record of the call's progress, the processing element can not only identify the failure causing network element, but also determine failures resulting from interactions and errors in stored data, stored control programs and network elements.

BRIEF DESCRIPTION OF THE DRAWING

The invention will be more readily understood after reading the following detailed description of a specific illustrative embodiment of the invention in conjunction with the appended drawings wherein.

DETAILED DESCRIPTION

The inventive surveillance method has the ability to monitor in real time the progress of calls as they traverse each network element enroute to their destination; thereby, overcoming the prior art limitation for fault detection and segmentation. Selected telephone calls entering the network are placed under surveillance by setting a predetermined bit in the message signal units which are exchanged between network elements for routing calls. At each network element, a copy of signaling messages used in establishing calls, sending queries, and the like, is forwarded to the processing element if the predetermined bit, associated with a selected call, has been set. The capability to receive and analyze signaling messages, associated with a particular call, from the various network elements affords a highly deterministic mechanism for providing detailed information relating to a fault; thereby, permitting more rapid and effective correction and shorter downtime.

It is contemplated that the present surveillance method may be effected by message signal units utilized by common channel signaling. A better understanding of the present method and surveillance network architecture will therefore be gained from the following discussion of signaling units, particularly, message signal units. Call establishment requires switches, databases, and the like, to exchange signaling messages or packets, referred to as signaling units. Specifically, in an exemplary surveillance network system which utilizes CCITT NO. 7 protocol, the signaling units are highly structured information packets used to transfer signaling and other information over signaling links. CCITT No. 7 protocol has three types of signaling units; namely, a Link Status Signal Unit (LSSU), a Fill-In Signal Unit (FISU) and a Message Signal Unit (MSU). Signaling units are differentiated from each other by a length indicator.

Figure 1:
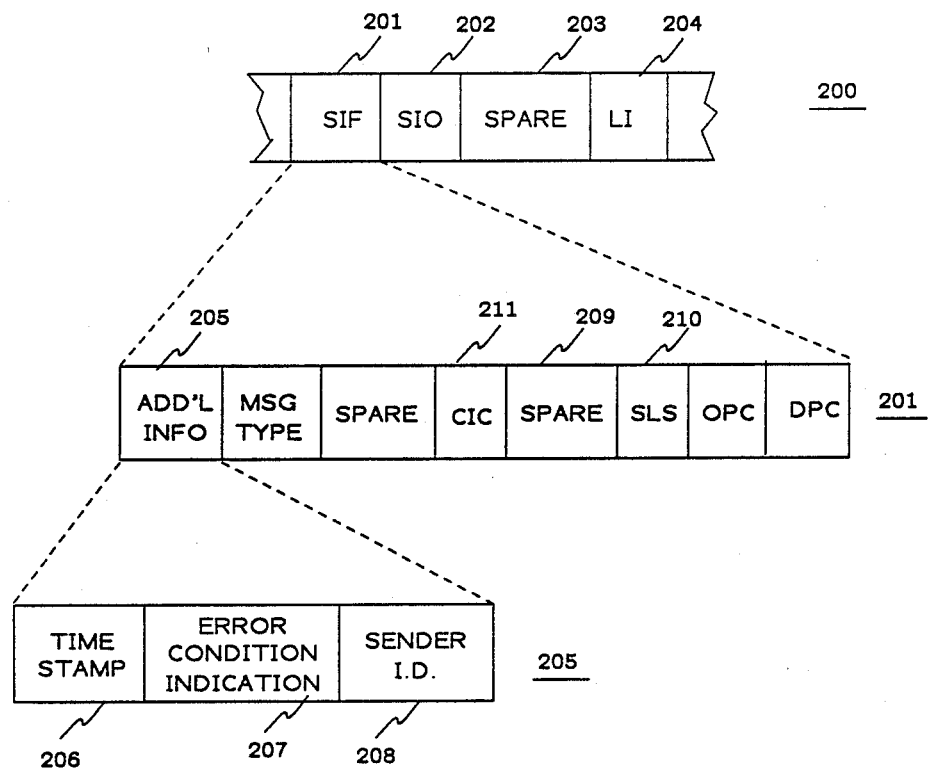
FIG. 1 shows a typical format for a message signal unit.

Message signal units contain a number of fields which carries information required for message transfer over data links. Referring to FIG. 1, the message signal unit includes: a variable length signaling information field (SIF) 201 used to carry signaling information by a user part (UP); a service information octet (SIO) 202 which identifies the user part, the priority of the message and whether the message pertains to a nation or international network; and a length indicator (LI) 204. A detailed discussion relating to the format of the message signal unit is given in the CCITT Red Book, *Telephone Signaling and Switching*, Vol. 6 (1985). Variable length signaling information field 201 includes variable length field 205, spare bit 209 and SLS field 210. It is contemplated that spare bit 209 following SLS field 210 be used to place a call under surveillance. However, other bit positions or a number of bits in a specific format may be used as a surveillance indicator. In general, the present surveillance method is applicable to all other bit or character oriented protocols used for communication on a network wide basis.

Figure 2:
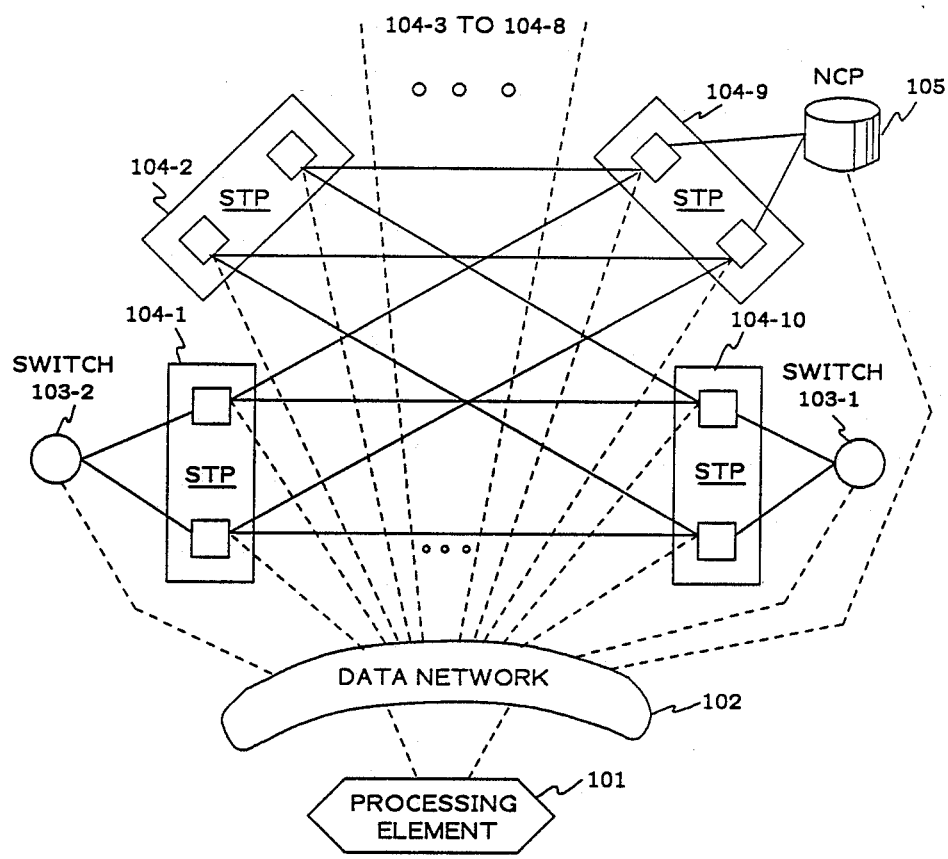
FIG. 2 shows an exemplary network and network surveillance system for illustrating the principles of the invention.

FIG. 2 illustrates an exemplary network and network surveillance system utilizing the present surveillance method. The exemplary surveillance network system utilizes common channel signaling for routing calls. It is to be understood, however, that the network system depicted in FIG. 2 is for the purpose of illustration only and not for the purpose of limitation. Other suitable communication network systems or computer network systems, whether optical or electrical, could be adapted to use the present end-to-end surveillance method.

As shown in FIG. 2, the exemplary surveillance network system comprises ten No. 2 signal transfer point pairs, 104-1 through 104-10, network control point (NCP) 105 and office switches, 103-1 and 103-2, each connected to processing element 101 via data network 102. Network control point 105 acts as a database machine that instructs switches, 103-1 or 103-2, as to the routing of certain calls. No. 2 signal transfer points (No. 2 STPs) are packet switches which switch signal messages from incoming signals to outgoing data links. Moreover, No. 2 STPs are deployed in mated pairs, so if one fails the other is there to handle the full message switching load. Network control point 105 and office switches, 103-1 and 103-2, are connected to No. 2 signal transfer points with a set of links called access links.

In the aforementioned surveillance network system, digital signaling links operating at 56 Kb/sec may be used as access links. Also, data network 102 may be a data packet network using, for instance, X.25 protocol, for facilitating the sending of signal units from network elements to processing element 101. Data network 102, thus, includes any associated data links between network elements and processing element 101.

The objective of processing element 101 is to continuously search for faults by tracing the progress of selected calls, either on a random or selective basis. To achieve end-to-end surveillance, processing element 101 uses normal common channel signaling No. 7 message signal units of selected calls to trace the progress of these calls from originating switches 103-1 and 103-2 to destination nodes, network control point 105 via No. 2 signal transfer point, pairs 104-1 through 104-10. These message signal units are exchanged between network elements during the normal process of establishing/routing a call. It should be noted that message signal units include queries sent to network control point 105. Calls are placed under surveillance by an office switch, either 103-1 or 103-2, on request by processing element 101 via data network 102. Message signal units pertaining to these calls are uniquely identified by switch, 103-1 or 103-2, by altering surveillance bit 209 in the message signal unit. For example, by setting surveillance bit to a first state, such as a logical "1" to indicate surveillance. It should be noted that when more than one bit is used, the bits may be altered to a predetermined format.

In a typical call, an office originating switch in establishing the call will send a query message to a network control point. The network control point analyzes the query message and sends an appropriate response message to the switch. The switch now sends an initial address message to another switch. In placing a call under surveillance, switch, 103-1 or 103-2, sets the surveillance bit of message signal units starting with the initial address message or the initial query message pertaining to the specific call under surveillance. In addition to its normal call processing responsibility, each subsequent network element analyzes the surveillance bit of all message signal units received and determines whether the bit is set. Based on this bit surveillance identification, at each network element enroute from office switch, 103-1 or 103-2, to a destination each network element sends a representation, such as a copy, of exchanged message signal units pertaining to the selected call to processing element 101 through data network 102. This includes any responses to a sending network element such as backward messages indicating address complete messages, unsuccessful backward messages or query responses. If misdelivered messages are received by switch, 103-1 or 103-2, No. 2 signal transfer point pairs, 104-1 to 104-10, or network control point 105, it sends a message signal unit copy to processing element 101 identifying it as a misdelivered message. Using information contained in the message such as circuit identification code (CIC) field 211, processing element 101 correlates messages for each call and temporarily stores all message signal units received. Subsequently, message signal units are erased if the associated calls successfully reach their final destination. Message signal units associated with call failures are not erased and, moreover, are available for fault analysis and fault segmentation by processing element 101. In addition to copies of message signal units sent to processing element 101 from network elements, associated transaction field 205 as illustrated in FIG. 1 is embedded by each network element in field 201. Associated transaction field 205 comprises: sub-field 206, a time stamp indicating the arrived time of the message signal unit; sub-field 207, an error condition indicator indicating, for example, any misdelivered messages; and sub-field 208, a sender identification indicating the sending network element. It should be noted that the error condition indication field 207 may also be used to convey other information requested by processing element 101.

Figure 3:
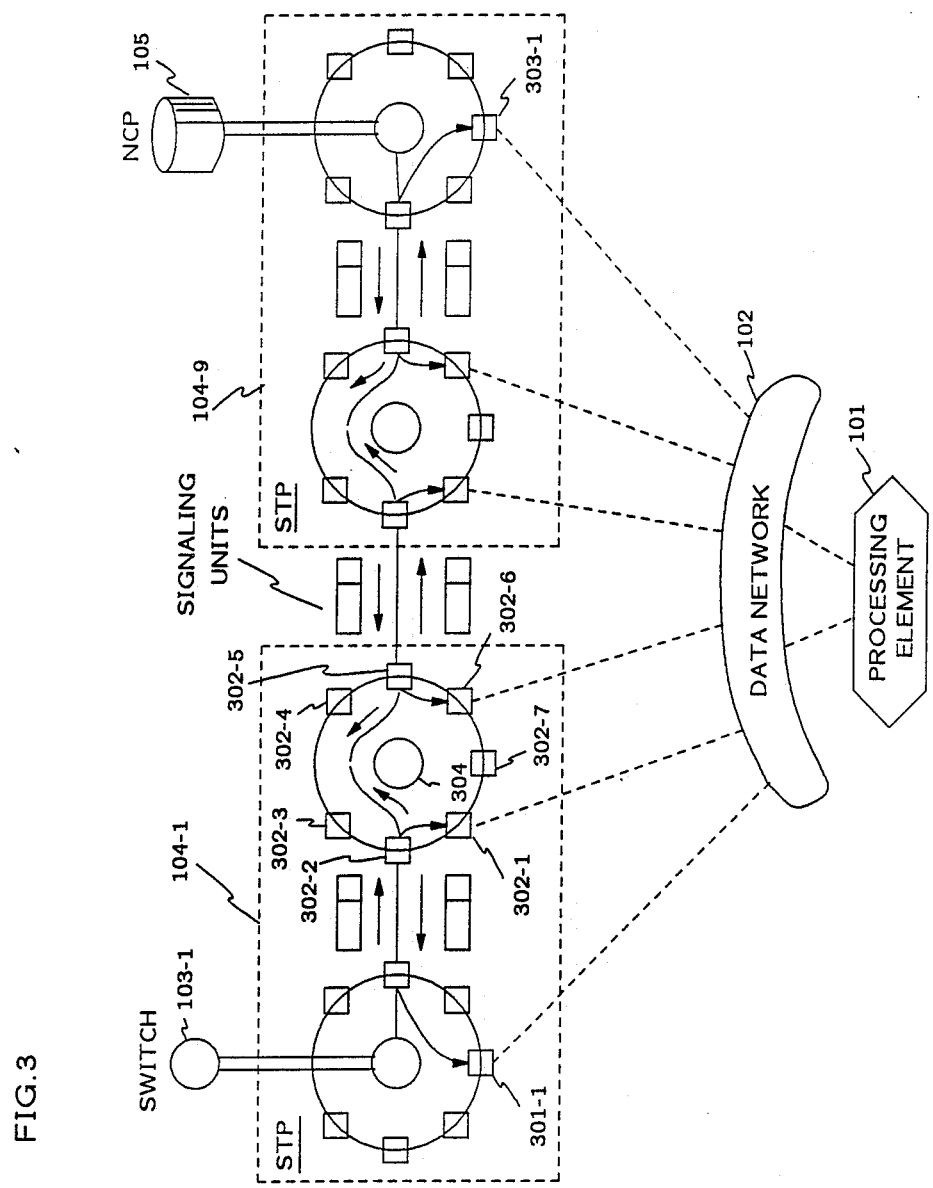
FIG. 3 shows a typical interconnection between network elements.

No. 2 signal transfer points switch signaling messages between network elements and forward message signal unit copies over data network 102 to processing element 101. For example, in FIG. 3 an exemplary architecture for a No. 2 signal transfer point consists of central host computer 304 and a series of nodes, 302-1 through 302-7, interconnected to form a token ring. Its mated pair also has a similar architecture and may be linked, for example, to office switch 103-1. Furthermore, No. 2 signal transfer point 104-1 can be connected to other No. 2 signal transfer points such as 104-9. There are two basic type of nodes in this type of architecture: host nodes which interface to the host computer, and link nodes which interface to the common channel signaling network. Two nodes on the token ring may be assigned for routing surveillance traffic to processing element 101. For example, as illustrated in FIG. 3, nodes 302-1 and 302-6 have been selected for routing the surveillance traffic. Thus, message signal units which are exchanged between network elements are forwarded to processing element 101 via data network 102 and are facilitated by token rings nodes of each No. 2 signal transfer points.

Different surveillance modes may be supported by processing element 101. For example, calls may be selected at random to be placed under surveillance or, in the alternative, may belong to a pre-specified category; such as, Advanced 800, Customer Account Service and the like. Also, other modes contemplated may take on a more focussed approach. The number and/or types of calls to be placed under surveillance may, for instance, be selected according to those specific network elements suspected of having troubles or be restricted to a specific route.

Since each selected call is tracked on an end-to-end basis, the progress of a call up to a last node sending a message is available to processing element 101. Algorithms in the processing element can identify not only a network element at which an error has occurred, but also any associated translational error in a database producing the error. Furthermore, the processing element, by requesting a response from interconnected networks, can provide surveillance of network interconnections to gateway switches. Also, network delays from network element to network element can readily be determined from sub-field 206, the time stamp information, in each message signal unit copy received from networks elements. Hence, the service quality of the network can be determined by recording call failures and delay times.

A uniqueness of this surveillance method is that when a failure occurs, a history of a call and its progress up until the instant of failure are available in real time for analysis. Retention of the call's progression provides a capability of detecting causes of failure and explanation of anomalies that would otherwise go undetected for an extended period of time. Compared with prior art philosophy of reacting to network faults or failures, the present surveillance method actively hunts for errors providing not only a quality control function, but an indication to an increased error rate which could possibly be due to recent changes in database, software and the like. Unlike the existing art of maintenance using external messages which adds to traffic congestion, this surveillance method actually becomes more productive with an increased error rate.

In the exemplary surveillance network system described herein, a group of 160 switches were selected at a time with 30 random calls placed under surveillance for each switch in the group over a 15 second period. A round robin surveillance of the entire network system was completed in a cycle time of 2 minutes. In this specific example, 4800 calls were sampled and assuming an error rate in the network system of 0.3%, for a confidence level of 95%, fault detection and segmentation was achieved in under 2 minutes.

It is understood that the embodiment herein is merely illustrative of the principles of the invention. Various other modifications may be made by those skilled in the art which will embody the principles of the invention and fall within the spirit and the scope thereof. For example, No. 2 signal transfer points or network control points may place selective calls under surveillance instead of the office switches as described hereinabove. The calls to be placed under surveillance may be selected by different criteria, for example, pertaining to a specific service category, or by a specific trunk group. In certain instances, No. 2 signal transfer points or network control points may alter the surveillance bit in message signal units pertaining to selected calls.

I claim:

1. A method of providing network surveillance for a call having associated signaling units, said method comprising the steps of:
    setting to a predetermined state at least one bit within signaling units pertaining to said call, said call traversing a plurality of network elements; and
    in response to said at least one bit with said predetermined state, transmitting to a processing element representation of signaling units exchanged between said network elements traversed by said call, said call being monitored on a substantially end-to-end basis.

2. The method of network surveillance according to claim 1 further comprising the step of detecting the state of said at least one bit.

3. The method of network surveillance according to claim 2 further comprising the step of making representations of said signaling units having said at least one bit with said predetermined state.

4. The method of network surveillance according to claim 3 further comprising the step of storing said representations of said signaling units at said processing element.

5. The method of network surveillance according to claim 4 further comprising the step of erasing said representations of said signaling units when said call associated with said signaling units successfully reaches a predetermined network element.

6. The method of network surveillance according to any one of the preceding claims further comprising the step of selecting said call in a predetermined manner.

7. The method of network surveillance according to claim 6 further comprising the step of augmenting said representations of said signaling units with an associated transaction information field of bits.

8. The method of network surveillance according to claim 7 wherein said associated transaction information field of bits includes a sender identification, a time stamp and an error condition indicator.

9. The method of network surveillance according to claim 8 further comprising the steps of correlating and analyzing said representations of said signaling units by said processing element for detecting and segmenting faults associated with said call.

10. A surveillance network system for monitoring the progress of a call on an end-to-end basis comprising a plurality of network elements capable of being interconnected to form a communication system for said call and a processing element connected to each of said network elements, each of said network elements including means for setting to a predetermined state at least one bit within signaling units pertaining to said call traversing said network elements and means responsive to said at least one bit with said predetermined state for transmitting to said processing element representations of said signaling units exchanged between said network elements.

11. The network surveillance system according to claim 10 further comprising means for detecting the state of said at least one bit.

12. The network surveillance system according to claim 11 further comprising means for making representations of said signaling units having said at least one bit with said predetermined state.

13. The network surveillance system according to claim 12 further comprising means for storing said representations of said signaling units at said processing element.

14. The network surveillance system according to claim 13 further comprising means for erasing said representations of said signaling units when said call associated with said signaling units successfully reaches a predetermined network element.

15. The network surveillance system according to any of claims 10–14 further comprising means for selecting said call in a predetermined manner.

16. The network surveillance system according to claim 15 further comprising the step of augmenting said representations of said signaling units with an associated transaction information field of bits.

17. The network surveillance system according to claim 16 wherein said associated transaction information field of bits includes a sender identification, a time stamp and an error condition indicator.

18. The network surveillance system according to claim 17 further comprising the steps of correlating and analyzing said representations of said signaling units by said processing element for detecting and segmenting faults associated with said call.

19. A network element within a network system comprising:

means for setting to a predetermined state at least one bit within signaling units associated with a call over said network system, said network element interconnected to a processing element;

means responsive to said at least one bit with said predetermined state for making representations of said signaling units; and means for transmitting to said processing element said representations of said signaling units.

20. The network element according to claim 19 further comprising means for augmenting said representations of said signaling units with an associated transaction information field of bits.

21. The network element according to claim 20 wherein said associated transaction information field of bits includes a sender identification, a time stamp and an error condition indicator.

* * * * *